Jan. 4, 1949.      E. SIMON ET AL      2,458,032
METHOD OF CEMENTING METHYL METHACRYLATE PLASTICS
Original Filed Jan. 26, 1942
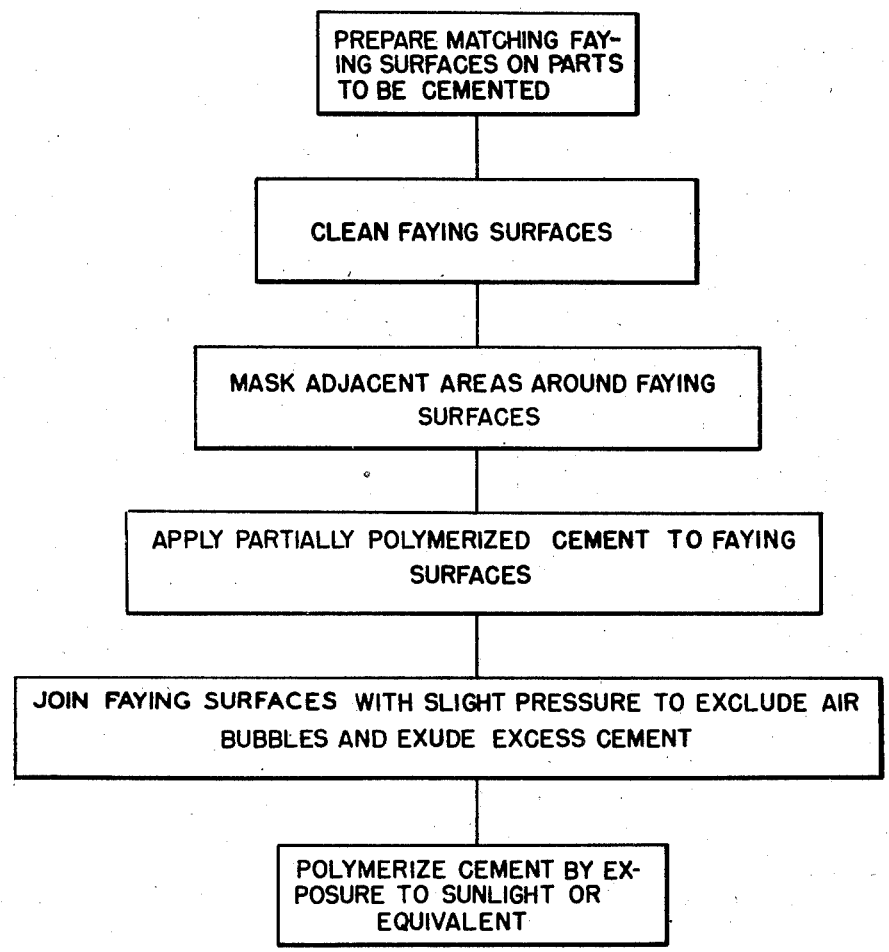
INVENTORS
ELI SIMON &
BY   MELVIN F. GEORGE JR.
*George Sullivan*
Agent Patented Jan. 4, 1949

2,458,032

UNITED STATES PATENT OFFICE 2,458,032

METHOD OF CEMENTING METHYL METHACRYLATE PLASTICS

Eli Simon, Los Angeles, and Melvin F. George, Jr., Hollywood, Calif., assignors to Lockheed Aircraft Corporation, Burbank, Calif.

Original application January 26, 1942, Serial No. 428,324. Divided and this application August 22, 1944, Serial No. 550,682

3 Claims. (Cl. 154—140)

This invention relates to an improved cementing technique for polymerized methyl methacrylate resins of the type used for windshield and other transparent closures for airplanes, in which use the transparent panes are usually formed to simple or compound curvatures to improve the streamlining of the enclosure. Such closures are relatively expensive to produce, and have very little, if any, salvage value if cracked, deeply scratched, or otherwise damaged. Also, in a skin stressed airplane fuselage considerable extra bracing around the transparent closure frame is required if the stresses are not to be shared by the closure. In the case of a pressurized compartment for high altitude flights, a differential air pressure load up to ten pounds to the square inch may be imposed on the transparent closure, which load can conveniently be carried into the mounting frame therefor by cemented attachments and reinforcing strips or ribs of like material.

This application is a division of our prior pending application, now abandoned, Serial No. 428,324, filed January 26, 1942, entitled Plastic cement and method of use, and relates to the method of repairing damaged methyl methacrylate plastic enclosures and applying reinforcements thereto.

Commercial examples of transparent organic resins of the methyl methacrylate type are "Plexiglas" as manufactured by Rohm & Haas, and "Lucite" as manufactured by du Pont. These two products are very similar in character, and the process and technique of this invention can be applied to either, as well as used to cement one to the other. It is understood that both commercial materials derive from liquid methyl methacrylate monomers of substantially identical properties, and are polymerized by heating until a final glass-like solid state is obtained, being cast or otherwise formed into flat sheets which can subsequently be formed as desired by heating and stretching or bending over a suitable molding form, since the products are thermoplastic. In fact, these materials are said to have a plastic memory, as they will straighten out if sufficiently reheated subsequent to the forming operation.

The process and technique of this invention is equally suitable for attaching reinforcing and other structural elements, or for patching damaged sheets of the transparent material. Also, the described organic plastics can be cemented to other materials such as metal and other structural materials.

It has heretofore been proposed that monomer, acid, and/or solvent type cements be used, as well as local heating and softening of the faying surfaces. However, the structural properties of such joints, as heretofore produced, have been very unreliable, tests of such joints showing a wide scatter in results, so that it has not heretofore been possible to design stressed connections approaching the tensile strength of the basic material, which is commonly considered to be 8,000 pounds per square inch at normal temperature. Because of the unreliability of cemented joints, as heretofore produced, the factor of ignorance has had to be maintained high, which has restricted or prevented the use of such cemented material in stressed structures. The optical properties of such joints have also been a mattter of considerable concern, as optical distortions in the resulting bond have hitherto prevented other than temporary emergency use of such joints or repairs in other than marginal areas of a transparent closure.

In describing our invention, the method or process has been schematically shown or described in a series of steps set forth in the accompanying drawing.

The present invention relates to the method of preparation and use of cementing material, and is based on the refinement and modification of liquid monomers of methyl methacrylate as commercially available from the manufacturers of thermoplastic polymerized acrylic resins of this type. Such monomers are supplied, treated with a small percentage of an inhibiter or preservative such as hydroquinone, to prevent polymerization during storage and distribution; and we have found it highly desirable to remove such inhibitors. One method of doing so is to distil the water-free monomer. During distillation we also reject the fractions below 95° and above 103° centigrade, as we have found the selected fraction to be superior for our purpose. If the monomer is contaminated with water, such water is removed as the temperature rises above 60° or 70° C., and dehydration is complete as the temperature reaches 75° C., or by drying the monomer over a good desiccating agent, such as anhydrous calcium sulphate or silica gel for twenty-four hours. The purified fraction obtained between the limits of 95° and 103° C. is desirably stored in a refrigerator until the next step is to be taken, as it would begin to polymerize in an autocatalytic process if left at room or summer temperatures. Next, from 4% to 6% of clean plastic chips—the polymerized form of the monomer—is dissolved in the dry and distilled monomer to slightly thicken the same. We have found that 4% of the polymer chips forms the best proportion for use in cementing Lucite and 6% is preferable for use with Plexiglas, perhaps because the former seems to be a more completely polymerized product. The resulting thickened liquid must be stored in a refrigerator pending use. An alternative method of thickening the original liquid will be described in connection with the final step in the preparation of the cement.

Polymerized methyl methacrylate resins of the type considered herein can be softened or rendered more elastic and flexible by the addition of small quantities of a suitable plasticizer, of which dibutyl sebacatate is an example. A suitable amount would lie in the range of 0 to 10% according to the degree of plasticizing desired; none being used if the maximum glass-like properties are desired.

In order to initiate the polymerization of the liquid monomer, a catalyst is added, of which benzoyl peroxide is a desirable example. Approximately 0.10% of this chemical is added to the desired volume of monomer approximately twenty-four hours before the cement is to be used. If the polymer chips have been previously dissolved in the monomer, the mixture is then returned to the refrigerator until ready to be used.

If the polymer chips were not used, the partial polymerization (thickening) of the monomer may be initiated by heating the solution to 80° C. for about an hour. Gradual thickening of the liquid will be noted. This reaction is exothermic and consequently autocatalytic when once started, so that the flask in which the solution is heated must be frequently shaken to prevent excessive temperatures in the center thereof, and the reaction must be carefully watched and the solution cooled quickly when the desired consistency is obtained. While we prefer to prepare batches of cement about twenty-four hours in advance, the prepared cement may be stored in a refrigerator at about 5° C. as such a temperature is sufficient to well retard further polymerization, so that the cement will keep for some time. If the cement becomes too viscous, it may be thinned down with the purified monomer. It will be understood that although the cement is stored under refrigeration, it is preferably used at room temperature.

In the fabrication of a patch or joint by the use of this cement, the following procedure is recommended, as consistent strength joints require rigorous detail procedure.

1. Remove protection paper covering from material to be cemented and wash surface well with alcohol or other solvent which will evaporate readily without leaving a residue. Pure 95% grain alcohol is recommended since it will leave no film after drying.

2. The surfaces of the material and patch that are not to be cemented are masked with tape or other material impermeable to the cement.

3. Immerse the cleansed surfaces in a tray of the cement—prepared as above. The period of immersion should be about fifteen minutes, exposing only the side to be cemented. If the joint is a straight line, the edge may be rested on a piece of felt saturated with the cement.

4. Remove and press the soaked parts together lightly to remove air bubbles; extreme care must be used to prevent introduction of impurities into the joints. The pressure used should be just sufficient to exclude bubbles and exude excess cement, and no more, as any excess pressure would weaken the resulting joint.

5. Place the joint under suitable clamps to maintain an equalized but very moderate pressure.

6. Allow the joint to remain undisturbed for a period sufficient for preliminary setting—under very light pressure—before exposing to sunlight or its equivalent for final polymerization.

7. Allow approximately eight hours exposure to sunlight, or an equivalent combination of artificial light and heat, before use. This period is sufficient to complete polymerization of the joint.

An example of a patching operation adapted for the repair of a marginal crack in a sheet of the acrylic resins under consideration comprises—

1. A triangular or arcuate wedge-like piece containing the crack or damaged area is sawed from the part, leaving a V notch, preferably with a rounded point to eliminate stress concentrations.

2. A wedge-shaped insert is then prepared which is larger and thicker than the wedge cut out in (1). The surfaces of both the notch and the insert are smoothed by filing to make a reasonably close fit.

3. The surface of the part adjacent to the V notch and the surface of the wedge is masked with a tape that is impermeable to the cement, leaving a slight exposed margin along the edges to be cemented.

4. The insert is then soaked in the cement for 15 minutes. The surface of the notch is coated with cement and allowed to stand for this period.

5. After the soaking period, the wedge is inserted in the notch and taped in place. It is then allowed to stand until a preliminary set is obtained, as by setting it aside overnight (12–14 hours).

6. After the initial set, which takes place during this 12 to 14 hour period, the tape is carefully removed and the whole part is exposed to sunlight or an artificial light equivalent thereto from four to six hours for final polymerization.

7. After this polymerization, which results in hardening the joint, the excess material of the wedge is ground off and the whole joint polished.

The physical strength of joints made by this repair procedure was compared with the strength of the parent material. It was found that the strength of the repaired joints when pulled at 0.3 inches per minute was 95% of that of the parent material. The strength of the joints, when pulled at .05 inches per minute, was 99% of that of the parent material.

The foregoing method can be applied with slight modifications to repairing damage, such as bullet holes, away from the margins of the transparent material. In such a case it is convenient to drill and/or ream a tapered hole large enough to remove all the damaged or cracked area, and a plug of patching material, of greater thickness than the original sheet, is cut to fit the hole and cemented in place as described above. The plug is then ground down to the level and curvature of the surrounding material, and polished as before mentioned.

It has been found that the partially polymerized cement described herein penetrates the Plexiglas type of acrylic plastic easier than it does the Lucite type, which is one reason for using less of the polymer chips in the Lucite cement. Hence, in making repairs, at least one of the component parts should preferably be of the Plexiglas type of plastic. For example, if the main part is Lucite, the insert should preferably be Plexiglas; if the main part is Plexiglas the insert may be either Lucite or Plexiglas, preferably the latter.

While the foregoing examples relate to repairing damaged areas of acrylic plastics, the cement of this invention is equally valuable for attaching structural reinforcements such as plastic or metal ribs, posts, and marginal reinforcements designed to apply either shear loads to the joint or tension loads to the sheet material. For example, a big transparent cockpit canopy, nose piece, or gun turret, may have intermediate reinforcing ribs of plastic material cemented thereto without materially affecting the field of view, as would be the case were the structure to be broken up into small panels by a structural framework designed to carry the surface pressure and skin-stresses imposed on adjacent parts of the fuselage.

We claim:

1. The process of forming a cemented joint between polymerized methyl methacrylate resins comprising cleaning the faying surfaces with a pure solvent which will evaporate readily without leaving a residue, masking adjacent areas to protect the finished surfaces thereof from the cement while exposing a narrow margin of the material adjacent the joint, applying to the faying surfaces a liquid cement consisting of a partially polymerized monomer fraction of the methacrylate resin from which the polymerized resin is produced and a suitable amount of polymerization catalyst, joining the faying surfaces under barely sufficient pressure to exclude air bubbles and exude excess cement, and polymerizing the cemented joint by exposure to the equivalent of sunlight for a period sufficient to convert the cement into polymerized resin of the same type and properties as the material being cemented.

2. The process of forming a cemented joint between polymerized methyl methacrylate resins comprising cleaning the faying surfaces with a pure solvent which will evaporate readily without leaving a residue, masking adjacent areas to protect the finished surfaces thereof from the cement while exposing a narrow margin of the material adjacent the joint, applying to the faying surfaces a partially polymerized liquid cement of the methacrylate resin from which the polymerized resin is produced and a suitable amount of polymerization catalyst, joining the faying surfaces under barely sufficient pressure to exclude air bubbles and exude excess cement, and polymerizing the cemented joint by exposure to the equivalent of sunlight for a period sufficient to convert the cement into polymerized resin of the same type and properties as the material being cemented.

3. The method of repairing a damaged sheet of polymerized methyl methacrylate resin, comprising cutting out the damaged area, fitting a wedge-like plug into the cut-out, said plug being thicker than the damaged sheet whereby to project thereabove on at least one side thereof, applying a partially polymerized liquid monomer fraction containing a suitable amount of polymerization catalyst and corresponding to the material from which the damaged sheet was produced, joining the faying surfaces under barely sufficient pressure to exclude air bubbles and exude excess cement, and polymerizing the cemented joint by exposure to the equivalent of sunlight for a period sufficient to convert the cement into polymerized resin of the same type and properties as the material being cemented, and thereafter removing the excess thickness of said plug as by grinding and polishing the same flush with the surrounding sheet material.

ELI SIMON.
MELVIN F. GEORGE, Jr.

REFERENCES CITED

The following references are of record in the file of this patent:

UNITED STATES PATENTS

| Number | Name | Date |
| --- | --- | --- |
| 2,263,536 | Dike | Nov. 18, 1941 |
| 2,346,036 | Leary | Apr. 4, 1944 |
| 2,367,670 | Christ | Jan. 23, 1945 |